Oct. 9, 1956
P. D. RITCHEY
2,766,082
BEARING SEALS
Filed March 3, 1955
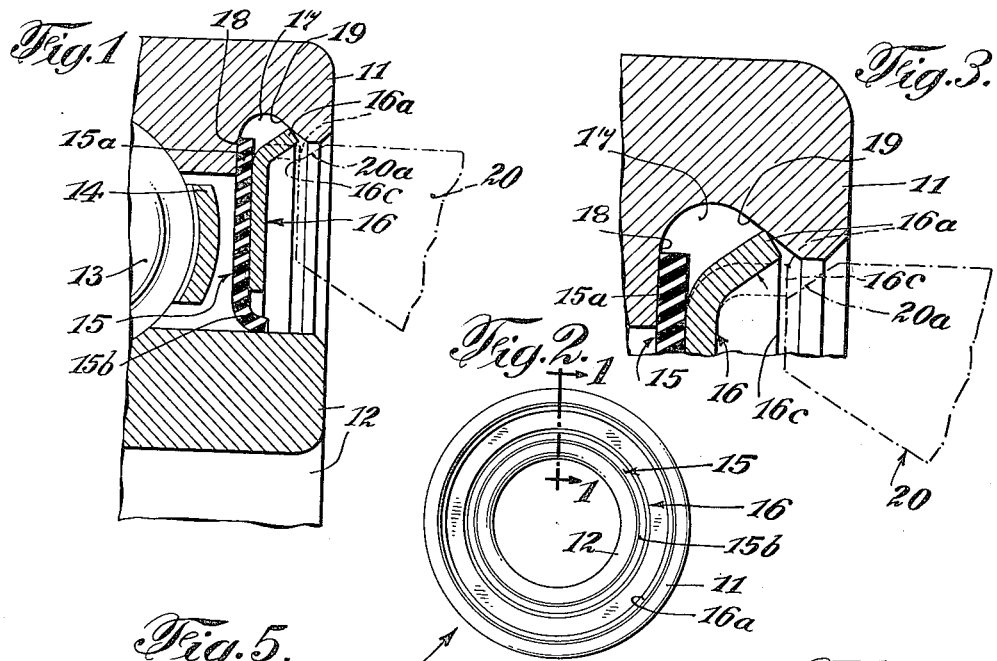
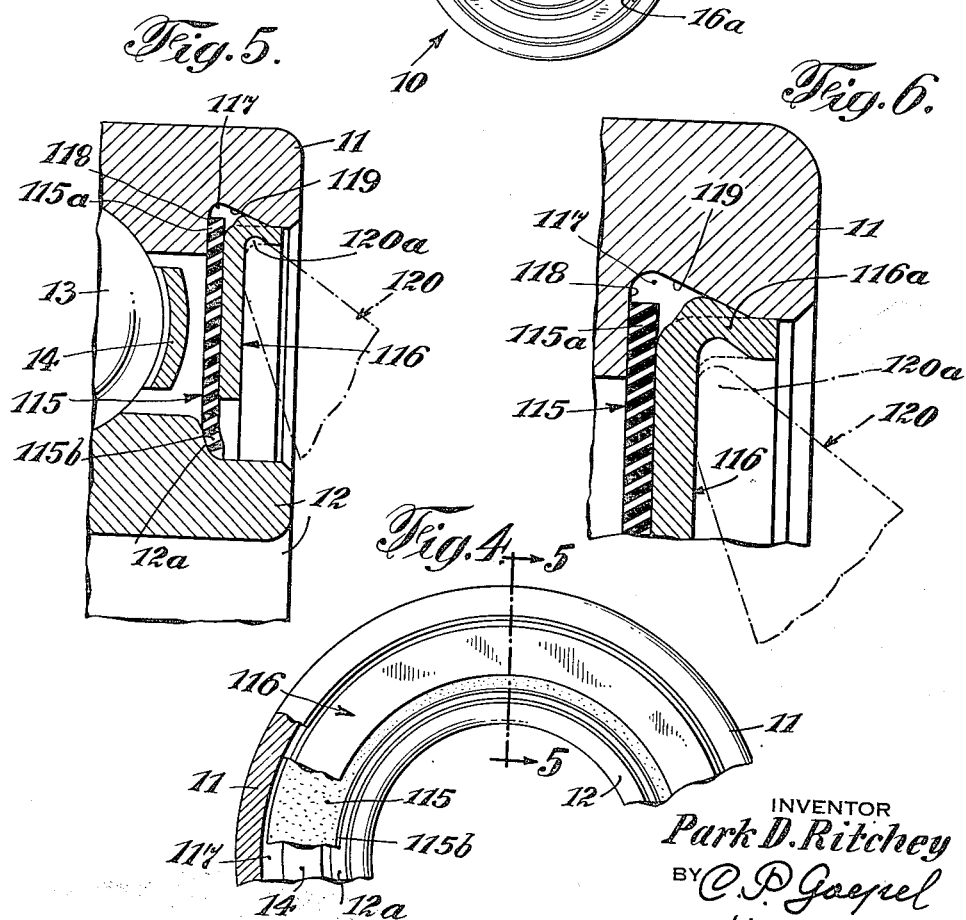
INVENTOR
*Park D. Ritchey*
BY *C. P. Goepel*
his ATTORNEY

United States Patent Office 2,766,082
Patented Oct. 9, 1956

2,766,082

BEARING SEALS

Park D. Ritchey, South Norwalk, Conn., assignor to Norma-Hoffmann Bearings Corporation, Stamford, Conn., a corporation of New York Application March 3, 1955, Serial No. 491,966

1 Claim. (Cl. 308—187.2)

This invention relates to anti-friction bearings, and more particularly to a seal in such devices.

The flexible seal of my invention prevents leakage at the outer ring of the bearing by adhering tightly against the shoulder of a recess therein, and is held in tight contact with said shoulder by the action of a metallic retaining plate whose substantially cylindrical flange is expanded into and bears against a tapered wall of the recess in the outer race ring.

A further advantage of my novel seal resides in the simplicity of its design and low manufacturing cost. The provision of a tapered recess in the outer ring of the anti-friction bearing instead of conventional grooves of various kinds, and the sealing method which provides that the metallic retaining plate bear against the tapered wall of the recess, render a dimensioning within close limits unnecessary, but still provide a satisfactory seal.

When other types of grooves or recesses for attaching metallic seal plates are used, tight holding of the plate requires especially close machining tolerances, not only of the width of the groove but also of the location of the groove with respect to the seating shoulder for the plate. A close tolerance must also be maintained in the length of the plate flange, since otherwise the expansion of the plate into the groove may result in a loosely held seal assembly. With the tapered recess, the close tolerances are not necessary as the plate will be locked tightly in position by its contact with the taper of the recess.

Various further advantages of my invention will become apparent in the course of the following detailed description of some at this time preferred embodiments thereof, taken in conjunction with the accompanying drawing wherein like characters of reference indicate similar elements, and the invention will be finally pointed out in the appended claim.

In the drawing:

Fig. 1 is a vertical section taken on line 1—1 in Fig. 2, showing the sealing and retaining members, and the mode of their insertion into the recess provided in the outer race ring of an anti-friction ball bearing;

Fig. 2 is a plan view of an anti-friction bearing sealed in accordance with my invention;

Fig. 3 is an enlarged partial view showing the recess in the outer race ring and the cooperating portions of the sealing and retaining members;

Fig. 4 is another plan view of an anti-friction bearing, partly broken away to show some of the component parts of an alternative form;

Fig. 5 is an enlarged section taken on line 5—5 in Fig. 4, illustrating a somewhat different mode of application of the retaining member; and Fig. 6 is an enlarged partial view of the recess in the outer race shown in Fig. 5, and the cooperating portions of the sealing and retaining members of an alternative form.

Referring now to the illustrated embodiments, and more particularly to Figs. 1 to 3, there is shown an anti-friction bearing generally designated by numeral 10, consisting of an outer race ring 11, inner race ring 12, balls 13, ball retainer 14, a flexible washer 15 and a metallic retaining or cover plate 16. The invention resides in the novel seal consisting of a flexible washer 15 held against the shoulder 18 of a recess 17 in the outer race ring 11, and a metallic cover plate 16 whose upper end 16a is held against the tapered portion 19 of the recess 17, and which bears against the peripheral portion 15a of washer 15 to tightly seal the outer race ring 11. A staking tool 20, shown in dot-dash lines in Figs. 1 and 3, brings the upper end 16a of retaining plate 16 into engagement with tapered portion 19. As shown in dotted lines, the upper end 16a, prior to the application of staking tool 20, forms a cylindrical flange substantially normal to the surface of plate 16, and is forced against the tapered portion 19 of recess 17 by the inclined surface 20a of tool 20 which bears against edge 16c of the cylindrical flange 16a. The flange 16a need not be exactly cylindrical; it may taper slightly either way. A very tight seal is thereby established between the outer portion 15a of washer 15 and shoulder 18. This seal washer 15 is made of flexible, non-foraminous material and extends radially inwardly to have a rubbing contact with the inner ring member 12. The contact between the inner end 15b of seal washer 15 and the inner ring 12 may cover a variety of forms, two of which are illustrated in Figs. 1 and 5.

Figs. 4 to 6 show another practical embodiment of my invention, which differs only slightly from that described hereinabove. Here, again, a staking tool 120 with a tapered end 120a, forces the metallic retainer 116 against washer 115, while at the same time expanding the cylindrical flange 116a (shown in dotted lines) against the tapering wall 119 of recess 117. Recess 117 extends between two cylindrical surfaces 11a, 11b in the bore of the outer race ring 11, with the diameter of surface 11a substantially equal to the outer diameter of flange 116a of member 116 prior to the application of staking tool 120, and somewhat larger than the diameter of the inner surface 11b. The inner end 115b of seal 115 has a rubbing contact with a shoulder 12a in the inner race ring 12.

As seen, the expanding device, such as the staking tool 20 or 120, which may be made in segmental form, performs two essential functions during its application against retainer 16 or 116, to wit: (a) it presses the metallic plate firmly against the flexible seal washer to cause its upper portion 115a to seat tightly against the shoulder in the outer race ring; and (b) it expands at the same time outwardly to press a median portion of the substantially cylindrical flange 116a of the metallic retainer 116 into firm contact with the tapered wall 119 of the recess 117 in the outer race ring.

While I have shown and described two preferred embodiments of my invention, the novel seal is capable of a variety of modifications, such as may occur to a person skilled in the art, and I therefore do not desire to be limited to the exact details shown, but only by the scope of the appended claim.

I claim:

As a novel element in an anti-friction bearing having an outer race member and an inner race member with rolling elements therebetween, said outer race member having an axial bore with an inner cylindrical surface and a marginal cylindrical surface, the diameter of said bore being greater within said marginal cylindrical surface than within said inner cylindrical surface, and an annular groove between said cylindrical surfaces defined by a substantially radial surface adjacent said inner cylindrical surface and an inclined surface tapering toward and merging with said marginal cylindrical surface, and a sealing washer of flexible non-foraminous material having an inner and an outer peripheral portion, said outer peripheral portion being in contact with said radial surface and said inner peripheral portion being in contact with said inner race member: a retaining member consisting of a flat metallic washer and an annular metallic flange integral with the outer peripheral portion of said metallic washer and extending substantially at right angles thereto, said flange having an outwardly projecting bead substantially in the median portion thereof between said outer peripheral portion of said metallic washer and the free end of said flange, the outer peripheral portion of said metallic washer being adjacent said radial surface of said groove in said outer race member with said outer peripheral portion of said sealing washer therebetween, the exterior surface of said bead being in contact with said inclined surface of said groove, the free end of said flange extending along said marginal cylindrical surface, and the inner peripheral portion of said metallic washer extending toward and short of said inner race member.

References Cited in the file of this patent

UNITED STATES PATENTS

| | | |
|---|---|---|
| 1,991,723 | Betz | Feb. 19, 1935 |
| 2,000,276 | Delaval-Crow | May 7, 1935 |
| 2,208,700 | Murden | July 23, 1940 |
| 2,237,616 | Smith | Apr. 8, 1941 |
| 2,701,150 | Hornell | Feb. 1, 1955 |

FOREIGN PATENTS

| | | |
|---|---|---|
| 580,435 | Great Britain | Sept. 6, 1946 |